United States Patent [19]
Kane et al.

[11] Patent Number: 5,853,620
[45] Date of Patent: Dec. 29, 1998

[54] COMPOSITIONS AND COMPOUNDS TO MINIMIZE HYDROGEN CHARGING AND HYDROGEN INDUCED CRACKING OF STEELS

[75] Inventors: Russell D. Kane, Houston; Michael S. Cayard, Woodlands, both of Tex.

[73] Assignee: InterCorr-CLI International, Inc., Houston, Tex.

[21] Appl. No.: 393,268

[22] Filed: Feb. 28, 1995

[51] Int. Cl.[6] ............................. C23F 11/14; C09K 15/16
[52] U.S. Cl. ..................... 252/394; 106/14.31; 508/110
[58] Field of Search .................... 252/394; 106/14.31; 508/110

[56] References Cited

U.S. PATENT DOCUMENTS

| | | | |
|---|---|---|---|
| 2,333,206 | 11/1943 | Sloan | 117/49 |
| 2,403,293 | 7/1946 | Miskel | 106/14 |
| 2,460,259 | 1/1949 | Kahler | 117/97 |
| 2,736,658 | 2/1956 | Pfhol et al. | 106/14 |
| 2,785,078 | 3/1957 | Keating, Jr. et al. | 106/14 |
| 2,848,414 | 8/1958 | Chenicek | 252/32.5 |
| 2,939,842 | 6/1960 | Thompson | 252/34.7 |
| 2,976,179 | 3/1961 | Westlund et al. | 117/127 |
| 3,015,580 | 1/1962 | Zisman et al. | 117/113 |
| 3,660,289 | 5/1972 | Cyba | 252/51.5 A |
| 3,674,450 | 7/1972 | Filachek et al. | 44/66 |
| 3,790,496 | 2/1974 | Hausler | 252/392 |
| 3,997,469 | 12/1976 | Howie | 252/392 |
| 4,131,583 | 12/1978 | Boerwinkle | 260/29.6 HN |
| 4,181,624 | 1/1980 | Koch | 252/182 |
| 4,292,047 | 9/1981 | Vartanian et al. | 44/65 |
| 4,376,635 | 3/1983 | Sung | 44/56 |
| 4,561,900 | 12/1985 | Brouard et al. | 106/246 |
| 4,600,520 | 7/1986 | Horodysky | 252/49.6 |
| 4,830,828 | 5/1989 | Anderson et al. | 422/7 |
| 4,849,119 | 7/1989 | Horodysky | 252/51.5 A |
| 5,344,674 | 9/1994 | Wu | 427/386 |
| 5,407,591 | 4/1995 | Emert et al. | 252/51.5 R |
| 5,538,653 | 7/1996 | Avery et al. | 508/229 |

OTHER PUBLICATIONS

Demertzis, et al. Determination of The Critical Hydrogen Permeation Current for API 5L X70 Steel by Using Inhibitors and Correlation with its Suseptibiltiy to SSC., pp. 4.257–4.264.

Bruckhoff et al. Mar. 25–29, 1985 Rupture of A Sour Gas Line Due to Stress Oriented Hydrogen Induced Cracking Failure Analyses, Experimental Results and Corrosion Prevention, pp. 389/1–18.

van Gelder. et al. Sep. 16–20, 1985 Effect of Corrosion Inhibitors for Sour Oil and Gas Transport on Hydrogen Uptake by Pipeline Steels, pp. 1387–1400 (only partially legible).

Edmondson, et al.1 992 Wet $H_2S$ Corrosion and Inhibition, pp. 441/1–18.

van Gelder, et al. Mar. 1985 Hydrogen Induced Cracking: Determination of Maximum Allowed $H_2S$ Partial Pressures, pp. 235/1–14.

Hoey, et al. Oct. 1987 Comparison of the slow strain rate technique and the NACE TM0177[(1)] tensile test for sulfide stress cracking resistance, pp. 42–45.

Wilhelm, et al. 1992 Inhibition of Absorption of Hydrogen by Steels in Wet $H_2S$ Refinery Environments, pp. 449/1–12.

Primary Examiner—Nancy Degen
Assistant Examiner—Deanna Baxam
Attorney, Agent, or Firm—Frohwitter

[57] ABSTRACT

The subject matter of this invention is directed to compositions and compounds to minimize hydrogen charging and hydrogen induced cracking of steels comprising, in one embodiment, a propylene diamine compound and in another a carrier and propylene diamines. Preferably, the composition of that embodiment is comprised of a hydrocarbon carrier and 1,3 propylene diamines. Alternatively, compositions of the present invention may be comprised of a carrier and octadecyl trimethyl ammonium bromide. In addition, where the environment dictates, the composition of the present invention may be comprised of a carrier, at least one 1,3 propylene diamine and octadecyl trimethyl ammonium bromide.

3 Claims, No Drawings

COMPOSITIONS AND COMPOUNDS TO MINIMIZE HYDROGEN CHARGING AND HYDROGEN INDUCED CRACKING OF STEELS

BACKGROUND OF THE INVENTION

1. Technical Field of the Invention

The invention relates to compounds and compositions for the reduction of hydrogen charging and hydrogen induced cracking of steels.

2. Related Art

The prior art includes mostly the development and use of inhibitive compounds and compositions for the lowering of the volume loss corrosion rate of steels in corrosive environments. Inhibitor compounds and compositions for use in commercial formulations are selected for their high level of "inhibitor efficiency" as defined solely by the magnitude of reduction in the volume loss corrosion rate produced by the application of the inhibitor compound and/or composition to the environment.

The only prior art describing the use of inhibitors to prevent cracking involves mitigation of stress corrosion cracking ("SCC") in various alloys and environmental systems. However, the process of SCC is different than hydrogen induced cracking ("HIC"). SCC is mechanistically a processes of localized corrosion concentrated and propagated by application of a tensile stress. Hydrogen produced by corrosion is not a factor in this type of cracking.

The prior art has been highly focused on the inhibition of volume loss corrosion and to a lesser degree SCC. No prior art shows a reduction in hydrogen charging characteristics producing a long term elimination or major reduction in hydrogen charging and most importantly HIC in steels. More specifically, there have been no chemical compounds or compositions identified that provide such protection.

The extent of the problem is two fold: (1) new equipment has fresh metal surfaces that will initially corrode very rapidly to produce high levels of hydrogen charging and HIC, and (2) older equipment after surface cleaning used for I.D. inspection removes the normally formed protective I.D. films and leaves fresh metal surfaces which can also produce high levels of hydrogen charging and HIC. The application of the present inventive compounds and compositions reduce both high hydrogen charging situations and greatly reduce the occurrence of HIC in such equipment.

SUMMARY OF THE INVENTION

The invention is directed to compositions for minimizing hydrogen charging and hydrogen induced cracking of steels comprising a carrier, and at least one 1,3 propylene diamine compound. Alternatively, in special environments, the invention is directed to a composition comprised of a carrier, and octadecyl trimethyl ammonium bromide. In addition, the composition of the present invention may be comprised of a carrier, at least one 1,3 propylene diamine compound, and octadecyl trimethyl ammonium bromide.

Preferably, the composition of the present invention is comprised of from about 90% to about 99% by volume diesel oil carrier and from about 0.1% to about 10% by volume 1,3 propylene diamine. Preferably the diamine is either N-coco 1,3 propylene diamine, or N-tallow 1,3 propylene diamine, or a mixture of both.

Alternatively, the composition of the present invention is comprised of from about 90% to about 99% by volume of a water soluble carrier, e.g. water or alcohol, and from about 0.1% to about 10% by volume octadecyl trimethyl ammonium bromide.

In addition, in a preferred embodiment for special applications, the compositions of the present invention are comprised of a carrier and a mixture of two or more of the following: N-coco 1,3 propylene diamine, N-tallow 1,3 propylene diamine, and octadecyl trimethyl ammonium bromide.

DETAILED DESCRIPTION OF THE INVENTION

The invention is directed to compounds and compositions that have protective properties with respect to hydrogen absorption of steels exposed to corrosive aqueous environments. The compounds and compositions of the present invention have been shown to be particularly effective in minimizing the absorption of hydrogen produced by corrosion reactions on the metal surface in environments containing corrosive species (e.g., hydrogen sulfide, cyanide, chloride, ammonia) and other agents that promote hydrogen absorption. Most importantly, the compounds and compositions of the present invention have the following important characteristics: reduction or elimination of hydrogen induced cracking ("HIC") and related environmentally induced cracking phenomena that occur in susceptible steels exposed to these environments, and they inhibit hydrogen absorption on the metal while still allowing some corrosion to take place on the metal surface at a sufficient rate to form protective surface films.

The compounds of the present invention reduce the amount of hydrogen produced on the metal surface due to corrosion while allowing the metal to still corrode and form protective films and the compounds may even be incorporated into these films. Therefore, even after removal of the compounds and/or compositions of the present invention from the environment, hydrogen absorption remains low as long as the corrosion films remain intact.

It is believed that when fresh steel surfaces are exposed to the corrosive environment hydrogen charging takes place at a very high rate. As the metal corrodes and forms surface corrosion films, the rate of hydrogen charging decreases. However, the initially high hydrogen flux activates cracking (i.e., HIC) sites inside of the steel which then propagate from their internal hydrogen pressure and externally applied or residual stress in the material. By application of the compounds and compositions of the present invention on the surface of the steel, the initially high hydrogen flux is greatly reduced and therefore, reduces or eliminates the cracking of the steel. Even after removal from the environment, a surprising result was found, the continued reduction of hydrogen absorption by the steel in a fresh corrosion environment.

The subject matter of the present invention includes compositions and compounds that can be applied as either an additive to a corrosive environment or applied directly to a metal surface for the sole purpose of eliminating or reducing hydrogen charging and minimizing or eliminating HIC and other hydrogen related cracking phenomena. The initial application is directed at minimizing HIC damage in refinery processes equipment, piping, vessels, oil and gas flowlines, and pipelines exposed to aqueous hydrogen sulfide containing environments.

The surprising results obtained by application of the present invention, as shown in the following tables, is the long term protection that can be obtained through the use of certain chemical compound(s) and compositions even after the active compound or composition is removed from the environment through the formation of protective corrosion films on the metal surface.

The invention is directed to compositions comprised of a carrier or carriers, and at least one propylene diamine compound, and/or octadecyl trimethyl ammonium bromide. The carrier(s) selected can be dependent on the active ingredient chosen for the particular applications and/or environment. For conditions where hydrogen is produced by the corrosion process and absorbed into a material exposed to the environment (e.g., wet hydrogen sulfide refinery and oil/gas production service where HIC of steels is a problem), the propylene diamines are very effective and preferred. The preferred carriers for such compositions are diesel oil (most preferred), mineral oil, grease, or other hydrocarbon-based oil soluble carriers. In such applications, preferably the carrier is present in an amount of from about 90% to about 99% by volume and the propylene diamine(s) is (are) present in an amount of from about 0.1% to about 10% by volume. Most preferably, the diamines are present from about 1% to about 2% by volume. In the above application, preferably the diamines are N-coco 1,3 propylene diamine, N-tallow 1,3 propylene diamine, or a mixture of the two.

In another preferred embodiment, the composition of the present invention is comprised of a carrier and octadecyl trimethyl ammonium bromide. Preferably the carrier is water or water-soluble, for example alcohol, etc. Where the composition is useful, the carrier is present in an amount of from about 90% to about 99% by volume and octadecyl trimethyl ammonium bromide is present in an amount from about 0.1% to about 10% by volume. Preferably, the octadecyl trimethyl ammonium bromide is present from about 1% to about 2% by volume.

Alternatively, the composition of the present invention may be comprised of a mixture of at least one of the diamines, N-coco 1,3 propylene or N-tallow 1,3 propylene, octadecyl trimethyl ammonium bromide, and a carrier and/or carriers.

No external catalysts are required for the use of the compounds or compositions of the present invention. However, the active compounds are usually applied through the use of a carrier substance. For periodic (batch) or one-time treatments, the compounds are blended with carriers that allow for application by spraying or swabbing. The desired range of concentration for the active ingredients in the environment in contact with the metal surface usually ranges from about 20 to about 200 ppm by volume.

The compounds and compositions of the present invention are particularly useful under conditions were hydrogen is produced by the corrosion process and may be absorbed into a material exposed to the environment. The most direct and notable application is related to wet $H_2S$ (hydrogen sulfide) refinery and oil/gas production service where HIC and/or hydrogen related cracking of steels is a major problem and limitation for exposed equipment. The following tables illustrate the benefits of the compounds of the present invention of (a) reducing hydrogen charging and (b) reducing and eliminating HIC in similar steels and environments found in wet $H_2S$ service conditions over a range of both acidic (Ph 3 to 5) and alkaline (Ph 7 to 10) conditions.

In the following tables, a Devanathan Cell, as known in the art was used with environments containing varying amounts of $H_2S$, $NH_4OH$, $CN^-$, Cl and $H_2O$. The conditions were aerobic. Due to the reactivity of $CN^-$, a surplus was used, e.g., 1000 to 5000 ppm in alkaline environment. From these acidic and alkaline environments, the compositions were examined for efficiency in sour water conditions. Below, the compositions are set forth first, followed by graphic summaries of the results. In the following, it should be noted that corrosion current density (viz. corrosion rate) is a direct indication of hydrogen production and permeation current density is a direct indication of hydrogen absorption.

Hydrogen Permeation Tests Test Environments and Surface Preparations

Series I
  Test Environment: Simulated Acidic Sour Water Solution specified in NACE standard TM0177
  Temperature: 125° F. (unless specified)
Test No. 1 (Blank-Acidic Media)
  Membrane surface was polished to a 600 grit finish, rinsed with acetone and was exposed to the environment.
Test No. 2 (Vacuum Grease)
  Membrane surface was polished to 600 grit finish and rinsed with acetone. A thin layer of vacuum grease was applied before exposing to the environment.
Test No. 3 Sulfide Film (F435A1)
  Saturated 75 ml of conc. $NH_4OH$ with $H_2S$ at 75° F. Added 125 ml of conc. $NH_4OH$ and 5 g of S. Applied it to the membrane with an eye dropper and a cotton swab. Let sit for about 1 min., rinsed and wiped with a KIM™ wipe. After 3 applications, a blue-black coating was obtained.
Test No. 4 (Inhibitor 1 (F872A1))
  Heated N-coco 1,3 propylene diamine and N-Tallow 1,3 propylene and mixed 5 ml of each with Exxon diesel (#2 diesel fuel). Stirred the mixture thoroughly and applied a thin layer onto the membrane and left overnight.
Test No. 5 Inhibitor 2 (F641A1)
  Mixed 5 g of octadecyl trimethyl ammonium bromide with 495 ml of ethanol and applied it onto the membrane and let it dry (about 5 min.).
Test No. 6 (Inhibitor 2 (F641A1): fresh soln)
  Continuation of Test No. 4 after being heated to 175° F., then with fresh solutions without taking cell apart at 125° F.
Series II
  Test Environment: Simulated Sour Alkaline Water 1M $NH_4OH+CN^-+Cl^-+H_2S$ (Initial-1M $NH_4OH+5000$ ppm $CN^-+1000$ ppm Cl $+H_2S$; Injected 320 ppm $CN^-$ at 55.25 hrs; Injected 960 ppm $CN^-$ at 77.5 hrs; $H_2S$ off at 80 hrs.)
  Temperature: 125° F. (unless specified)
Test No. 7 (Blank 3-Alkaline Media)
  Membrane surface was polished to a 600 grit finish, rinsed with acetone and exposed to the environment.
Test No. 8 (Inhibitor 2 (F641A1))
  Mixed 5 g of octadecyl trimethyl ammonium bromide with 495 ml of ethanol and applied it onto the membrane and let it dry (about 5 min.).
Test No. 9 (Inhibitor 3 (F872A2))
  Same inhibitor as F872A1 (Heated N-coco 1,3 propylene diamine and N-tallow 1,3 propylene diamine and mixed 5 ml of each with Exxon diesel (#2 diesel fuel)) with a different carrier, namely, mineral oil instead of Exxon diesel. Stirred the mixture thoroughly and applied a thin layer onto the membrane.
Test No. 10 (Sulfide Film 2 (Ironpyrrhotite Scale))
  The sample membrane was immersed in deionized water inside of a SSR vessel. The solution was deaerated and saturated with hydrogen sulfide. The pressure was brought to 225 psig with hydrogen sulfide and then temperature was brought to 250° F. The membrane was taken out after 3 days of exposure rinsed with deionized water and used in hydrogen permeation test.

While the invention is susceptible to various modifications and alternative forms, specific embodiments have been shown by way of example and will be described in detail herein. However, it should be understood that the invention is not intended to be limited to the particular compositions disclosed. Rather, the invention is to cover all modifications, equivalents and alternatives falling within the spirit and scope of the invention as defined by the appended claims.

We claim:

1. A composition to minimize hydrogen charging and hydrogen induced cracking of steels consisting essentially of:
   a carrier selected from the group consisting of diesel oil, mineral oil, and grease; N-tallow 1,3 propylene diamine; and N-coco 1,3 propylene diamine.
2. The composition of claim 1 wherein the diamines are present in an amount of from about 0.1% to about 10% volume.
3. The composition of claim 1 wherein the carrier is present in an amount of from about 90% to about 99% by volume and the diamines are present from about 0.1% to about 10% by volume.

* * * * *